UNITED STATES PATENT OFFICE.

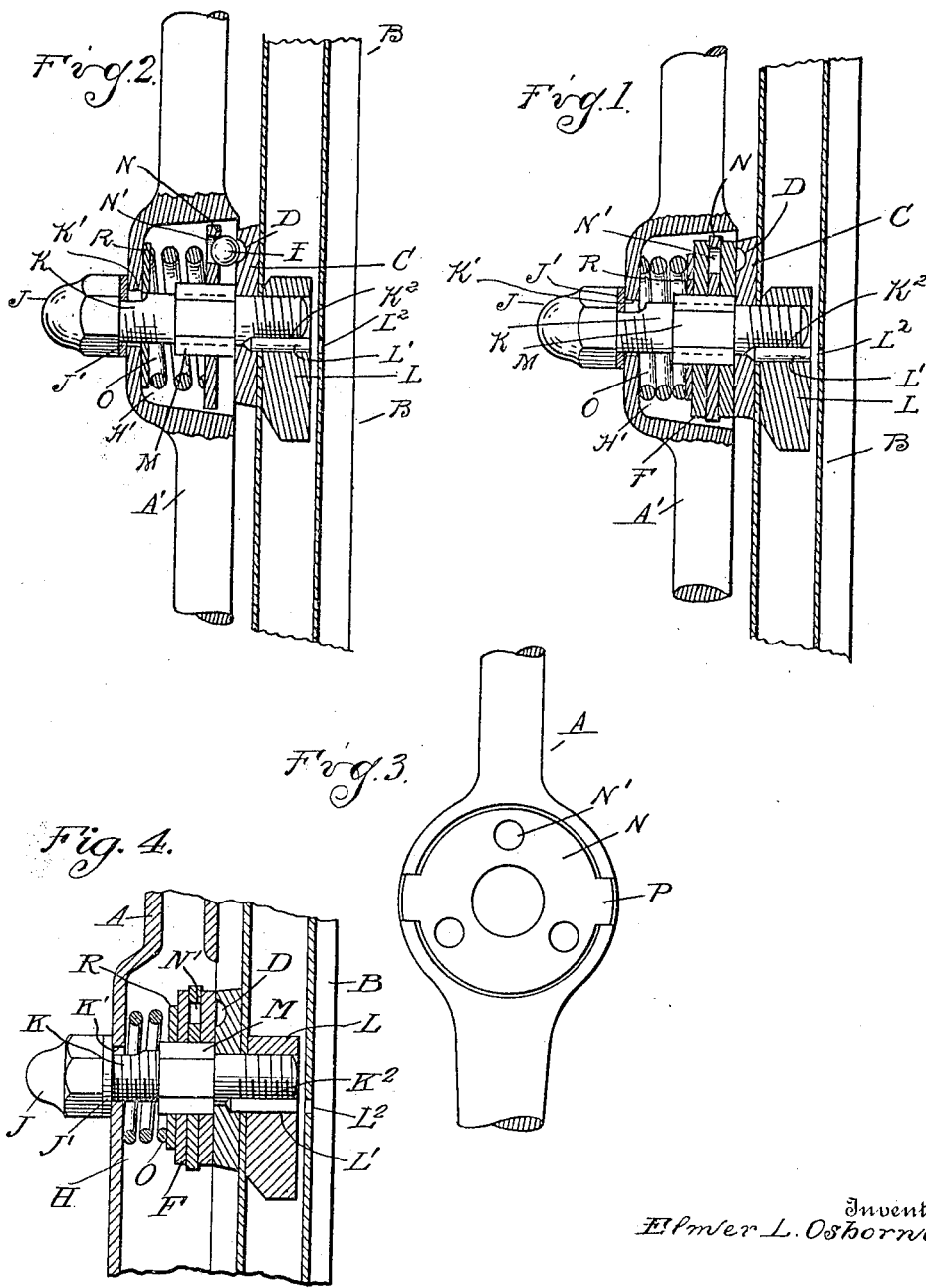

ELMER L. OSBORNE, OF DETROIT, MICHIGAN, ASSIGNOR TO RANDS MANUFACTURING COMPANY, OF DETROIT, MICHIGAN, A CORPORATION OF MICHIGAN.

WIND-SHIELD PIVOT.

1,280,822.  Specification of Letters Patent.  Patented Oct. 8, 1918.

Application filed May 11, 1916. Serial No. 96,790.

*To all whom it may concern:*

Be it known that I, ELMER L. OSBORNE, a citizen of the United States of America, residing at Detroit, in the county of Wayne and State of Michigan, have invented certain new and useful Improvements in Wind-Shield Pivots, of which the following is a specification, reference being had therein to the accompanying drawings.

This invention relates to wind shield pivots, and more particularly to an improved pivot construction for wind shields adapted to be locked in various positions of adjustment.

Among the objects of the invention are to provide standard interchangeability in wind shield construction irrespective of whether the side arms are forged, cast or pressed; to provide an interchangeable pivot construction that will permit the manufacture of standard parts adaptable for either the friction or ball type of pivot lock; to provide means for preventing injury to the ball race or sockets by a novel arrangement which will permit the balls to float back in passing from one seat to another, this same means being also employed with advantage when the friction type of pivot is employed; to so construct and arrange the parts that the pivot can be changed from the friction type to the ball type by merely adding the balls to the assembly, and a ball lock pivot can immediately be changed to a friction pivot by substituting the friction washers; and in general to provide a new and improved and standardized construction of the character above referred to.

The invention further resides in such details of construction and arrangements and combinations of parts as will more fully hereinafter appear.

In the drawings:

Figure 1 is a vertical sectional view showing my invention in use in connection with drop-forged side arms; Fig. 2 is a view similar to Fig. 1 but showing a ball type of pivot substituted for the friction type; Fig. 3 is a fragmentary end view of the parts shown in Fig. 1; Fig. 4 is a view showing a pressed steel side arm to which the pivot may be applied.

In the construction shown in the drawings, A designates the side arm or standard and B the frame for the glass panel of the wind shield. Fixed to the frame B is a pivot C, and for locking the frame in various positions of adjustment the pivot C is provided with one or more seats D for receiving the ball lock members E, where the pivot construction is of the ball type.

Heretofore it has been customary to form practically every shield with a different design, depending on whether or not a ball type of pivot or the friction type was to be employed. The present invention contemplates a construction in which the parts are so standardized and made interchangeable that the ball type of pivot can at any time be changed to the friction type by simply substituting the friction washers F for the balls E. My novel pivot assembly has the further advantage that it can be extended either into the recess H of a pressed arm A, such as is shown in Fig. 4, or into the seat H' formed in the cast or drop forged arm A' as shown in Figs. 1 and 2.

In either case the pivot assembly is complete as a unit and in attaching it to the side arm it is only necessary to remove the nut J and washer J' from the end of the stud K and insert the latter through the aperture K' in the side arm. Upon reëngaging the washer J' and the nut J and tightening the lock up on the stud K, the ball members E are spring pressed against their seats D in the pivot member.

In detail the construction and operation of the assembly is as follows: The stud K projects through the pivot member C and at its inner end is screw-threaded into an elongated pivot plug L, located inside of the panel frame B. The pivot C, plug L and stud K are all locked in fixed relation to each other and to the panel frame by means of a locking pin L' inserted through an opening L² in the frame, and engaging the key way K² in the stud K. Sleeved upon the stud is an elongated bearing M over which fits the floating disk N that forms the non-rotatable portion of the pivot. The disk N is also provided with seats N' for receiving the locking balls E when the assembly is employed as a ball type of pivot.

While this disk is free to float back against the tension of the spring O it is held against rotative movement by wings P, as shown in Fig. 3. Thus upon adjustment of the panel frame, the ball members E together with the floating disk N will be held from rotation, but the spring O will give sufficiently to avoid any injury to the ball race or seats, and as soon as the ball members E again register with the seats D they will be sprung into locking engagement by the action of the spring O. This arrangement is particularly advantageous where the upper portion of the side arms are rigidly held together by the automobile top, as the pivot assembly allows a compensation not permitted by the arms themselves.

It is also equally advantageous when the pivot assembly is set up as a friction type, as shown in Fig. 2. In this case the ball members E are omitted and the friction washers F substituted therefor. The latter are sleeved on the bearing M upon opposite sides of the floating disk N, in this construction the seat washer R being preferably moved over on to the opposite sides of the spring O from the positions shown in Fig. 1.

From the above description it will be apparent that the change from the ball type of pivot to the friction type, or from the friction type to the ball type of pivot can be easily made at any time and without the employment of any additional members other than substituting the friction washers F for the balls E or vice versa. Moreover the parts of the pivot assembly can be standardized and so arranged that the pivot can be readily attached to and successfully used with either cast, forged or pressed side arms. While I have shown and described the pivot assembly in connection with the upper pivot, it is adapted for use also for the lower pivot. The invention therefore is not limited to the particular use mentioned nor to the details of construction except as specified in the appended claims:

What I claim as my invention is:

1. The combination with a supporting standard and a frame movably supported by said standard, of a pivot assembly comprising a stud member fixed to the frame, pivot members mounted on said stud, one of said members being locked in relation to the frame and the other of said members being locked in relation to the standard, said members being adapted to interchangeably receive therebetween a plurality of different kinds of locking members.

2. The combination with a supporting standard and a frame movably supported by said standard, of a pivot assembly comprising a stud member fixed to the frame, pivot members mounted on said stud, one of said members being locked in relation to the frame and the other of said members being locked in relation to the standard, said members being adapted to interchangeably receive therebetween a plurality of different kinds of locking members, and a spring normally pressing said pivot members toward each other.

3. The combination with a standard having a recess, of a swinging frame member, a pivot assembly carried by said frame member, comprising relatively movable disks, interchangeable locking means therebetween, and a stud fixed to the frame and carrying said disks, one of said disks having a portion adapted when inserted in the recess in the standard to hold said disk from rotative movement relative to the standard.

4. The combination with a supporting standard and a swinging frame, of a pivot assembly carried by said frame and adapted to pivotally engage said standard, said assembly having relatively movable members, one of which is fixed in relation to the frame and the other of which is held from rotation when engaging the standard, said members being spring-pressed toward each other and being arranged to receive therebetween interchangeably, ball locking members and frictional disk locking members.

In testimony whereof I affix my signature.

ELMER L. OSBORNE.

Copies of this patent may be obtained for five cents each, by addressing the "Commissioner of Patents, Washington, D. C."